United States Patent [19]

Probst

[11] Patent Number: 4,849,894

[45] Date of Patent: Jul. 18, 1989

[54] PROCESS FOR DETERMINING OPERATING CONDITIONS OF A MOTOR VEHICLE FROM THE OUTPUT SIGNALS OF A SENSOR FOR A RELEVANT OPERATING VARIABLE

[75] Inventor: Max J. Probst, Munich, Fed. Rep. of Germany

[73] Assignee: Bayerische Motoren Werke A.G., Munich, Fed. Rep. of Germany

[21] Appl. No.: 110,717

[22] PCT Filed: Dec. 12, 1986

[86] PCT No.: PCT/EP86/00742

§ 371 Date: Aug. 12, 1987

§ 102(e) Date: Aug. 12, 1987

[87] PCT Pub. No.: WO87/03720

PCT Pub. Date: Jun. 18, 1987

[30] Foreign Application Priority Data

Dec. 12, 1985 [DE] Fed. Rep. of Germany ....... 3543940

[51] Int. Cl.[4] ...................... G06F 15/20; G01H 11/06

[52] U.S. Cl. .......................... 364/431.01; 364/551.01; 364/424.03

[58] Field of Search ...................... 364/431.01, 431.11, 364/487, 551.01, 558, 424.03; 73/602, 646; 382/48

[56] References Cited

U.S. PATENT DOCUMENTS

| | | | |
|---|---|---|---|
| 4,541,115 | 9/1985 | Werth | 382/14 |
| 4,559,602 | 12/1985 | Bates, Jr. | 364/487 |
| 4,574,265 | 3/1986 | Kaiser et al. | 364/431.01 |
| 4,583,176 | 4/1986 | Yamato et al. | 364/431.11 |
| 4,607,528 | 8/1986 | Kallergis | 73/602 |
| 4,719,587 | 1/1988 | Berte | 364/551.01 |

FOREIGN PATENT DOCUMENTS

| | | |
|---|---|---|
| 2351400 | 10/1973 | Fed. Rep. of Germany . |
| 2906443 | 2/1979 | Fed. Rep. of Germany . |
| 2922371 | 12/1980 | Fed. Rep. of Germany . |
| 3409487 | 3/1984 | Fed. Rep. of Germany . |
| 2070776 | 1/1981 | United Kingdom . |

*Primary Examiner*—Parshotam S. Lall
*Assistant Examiner*—V. N. Trans
*Attorney, Agent, or Firm*—Barnes & Thornburg

[57] ABSTRACT

In the case of a process for determining operating conditions of a motor vehicle from the output signals of a sensor for a relevant operating variable, by means of the output signal of the sensor and additional analyzers, first an analysis takes place of a sensor signal with respect to various relevant operating parameters, and on the basis of the values of the operating parameters, an n-dimensional (for exmaple, two-dimensional) pattern is generated. This pattern, that in principle is also known from the field of speech recognition and speech processing, is compared with preset patterns and permits a simple and fast analysis of the current operating conditions and a fast recognition of an imminent critical operating condition. Corresponding warning and remedial measures can then be carried out without difficulty.

4 Claims, 3 Drawing Sheets

PROCESS FOR DETERMINING OPERATING CONDITIONS OF A MOTOR VEHICLE FROM THE OUTPUT SIGNALS OF A SENSOR FOR A RELEVANT OPERATING VARIABLE

BACKGROUND AND SUMMARY OF THE INVENTION

The present invention relates to a process for determining operating conditions of a motor vehicle from output signals of a sensor for a relevant operating variable. The output signals are supplied directly and in parallel via an analyzer with respect to a relevant parameter, to an evaluating device.

This type of process is known from German Published Unexamined patent application No. 3,007,747 and has the purpose of obtaining the information contained in the output signal of the sensor concerning an additional operating variable, with an objective of saving a separate sensor for this additional operating variable. The sensor, in this known process, has the purpose of determining a physical value, such as a rotational speed, a path, an angular positionor a pressure, and receiving, as additional information, a statement concerning, for example, the temperature or an additional pressure. The primary information contained in the output signal of the sensor and the additional information are used for controlling the access to a characteristic curve or a characteristic diagram.

An objective of the present invention is to provide a significantly improved process for determining operating conditions of a motor vehicle with respect to the amount of the obtained information as well as with respect to the conversion into measures resulting from it.

This and other objectives are achieved in the present invention in a process for determining operating conditions of a motor vehicle from output signals of a sensor for a relevant operating variable, these output signals being supplied directly to an evaluating device in parallel to this direct supply, supplied to the evaluating device via an analyzer with respect to a relevant parameter, this process comprising the steps of analyzing, via at least one additional analyzer with respect to an additional parameter, the output signal. The process also includes the steps of supplying the additionally analyzed signal to the evaluating signal in parallel to the directly supplied output signal, and generating in the evaluating device an at least two-dimensional pattern, the shape of this pattern being determined by the output signals of the sensor and of the analyzers. The pattern is compared with preset patterns, and an indicating measure is provided when the limit pattern for a critical operating condition is approached.

Of central importance for the invention is the at least two-dimensional pattern that is known from the field of speech recognition. In speech recognition, the output signal of the sensor is evaluated by the analyzers with respect to all or to a large part of the information contained in it. Each information influences the pattern in a characteristic way. The comparison of the characteristics of the current pattern with the characteristics of the present pattern will then result in a concrete statement as to what extent the current operating condition can still be tolerated or to what extent it has approximated a critical operating condition.

The present invention may, for example, be applied to a pressure sensor that determines the loading of a chassis spring of a motor vehicle at the point of support. The additional information contained in it, such as the fundamental frequency, the excitation frequency, the amplitude and the change of these frequencies and amplitudes, in addition to the primary information of the pressure are converted into a corresponding pattern form. The comparison of the current pattern with the preset patterns takes place by the conventional process of image comparison, for example, by a correlation analysis. In correlation analysis, the correlation coefficient represents a precise statement concerning the conformity of the current pattern with a preset pattern. In addition, other processes for the image analysis are also contemplated, such are used, for example, within the framework of photographic images for the automatic focusing of a picture.

In contrast to other known processes for the determination of operating conditions, no characteristic diagram is required in the present invention that requires a lot of storage space, since the characteristics of the pattern can be compressed considerably without any significant loss of content. Each operating condition can be recognized in a picture and because of the characteristic picture form, early discloses a tendency of reaching a critical operating condition. As a result, it becomes possible to trigger in time, warning and display measures for a critical operating condition and to securely avoid this operating condition.

In certain preferred embodiments, the preset patterns are generated under defined operating conditions in a preceding learning step and thus, a realistic picture of the currently occurring operating conditions and their effects on the information is obtained. In contrast to, for example, the use of a characteristic diagram that as a rule is not obtained by means of the respective object, but is preset from the start, this measure has the advantage of obtaining the pattern individually and thus at any time obtaining a precise statement concerning the current operating condition.

The acoustical warning provided in certain preferred embodiments expands the practical benefit of the invention because the user of the motor vehicle receives an additional aid for avoiding a critical operating condition by corresponding countermeasures.

Finally, in certain preferred embodiments, at least one additional sensor is included, the output signal of this additional sensor controlling access to the preset patterns. This provides the localization of the respective current operation condition by the additional operating variables sensed by the additional sensor and thus, accelerating and making more precise the finding of the appropriate preset pattern. This is of considerable significance particularly for fast changes of the operating condition because even then, the respective relevant preset pattern can be found within a short and still sufficient amount of time.

Other objects, advantages and novel features of the present invention will become apparent from the following detailed description of the invention when considered in conjunction with the accompanying drawings.

DETAILED DESCRIPTION OF THE DRAWINGS

Figure 1:
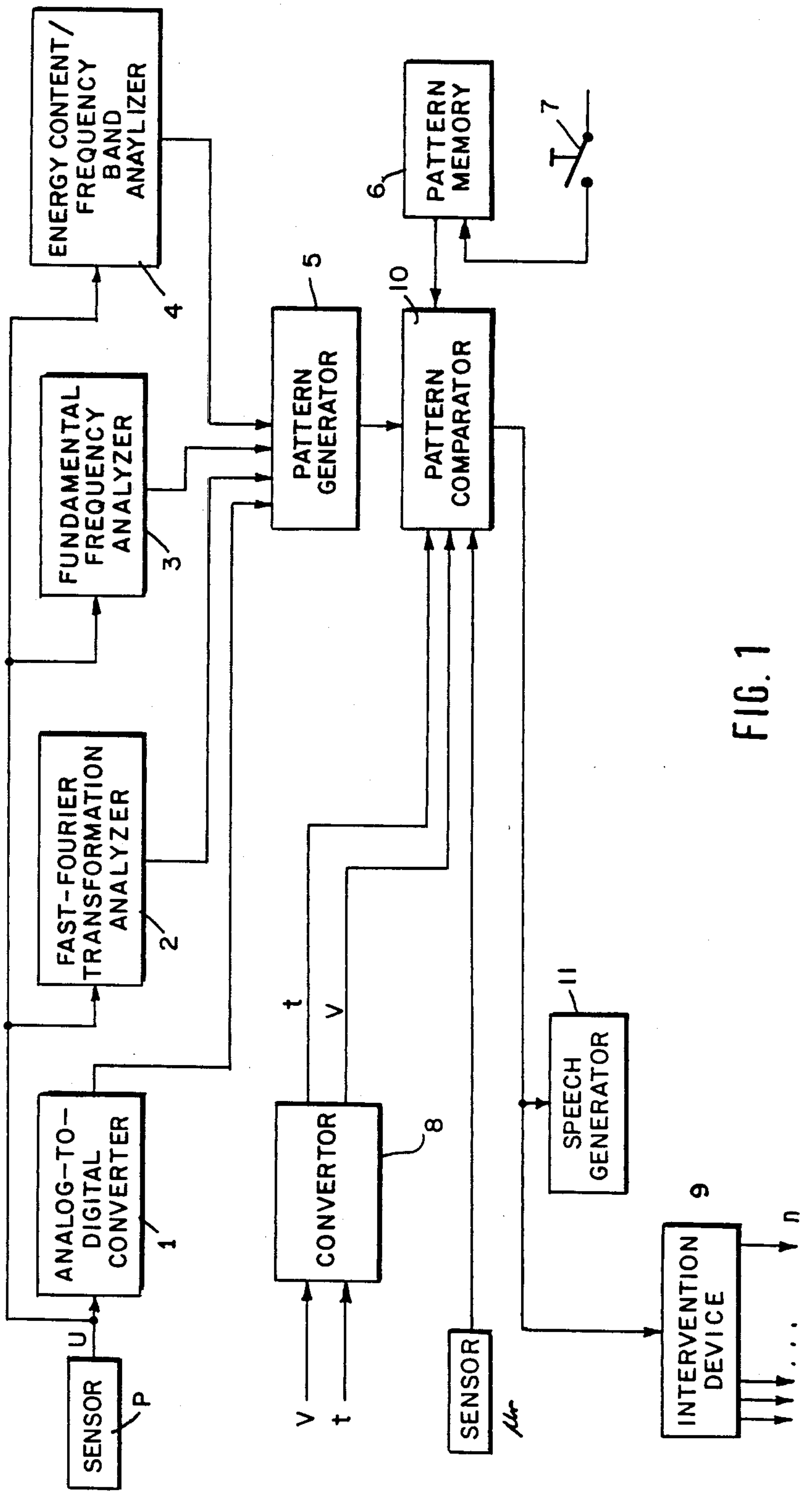
FIG. 1 is a block diagram of a preferred embodiment of the present invention.

In the block diagram of FIG. 1, the output signal of one signal sensor is used directly and is also used after being analyzed in different ways in order to obtain a two-dimensional pattern. This sensor may, for example, be a pressure sensor P that is arranged between a wheel spring and the vehicle body. The wheel may be the right front wheel, for example.

The analysis of the output signals furnished by a pressure sensor P of this type in the form of a variable alternating voltage U takes place in the illustrated preferred embodiment by means of a Fast-Fourier transformation, a fundamental-frequency analysis (GFA) and an analysis of the energy content via a preset frequency band (f/u). For the latter term, only the work "energy content" will be used in the following.

The circuits in which these three analyses are carried out in FIG. 1 have the numbers 2, 3 and 4 and operate in parallel to an analog-digital converter 1 via which the signal U is digitized. The output signals of the circuits 1 to 4 are inputs to a pattern former 5 that operates in a known way. Reference is made in this regard, for example, to the journal *Electronic Design*, July 9, 1981, Pages 110 et seq., where the pattern generation for speech signals is shown and which is herein incorporated by reference. Analogous to the output signal of the pressure sensor P in FIG. 1, the above types of analyses are also customary in the case of speech signals. The digital values that for speech signals were obtained from an original voltage signal U and were used in the same way as the present invention, as well as the values for the frequency response, the fundamental frequency and the energy content, in the *Electronic Design* journal pattern former, also result in a pattern that is generated in a pattern-generator corresponding to the circuit 5 of FIG. 1.

Figure 2:
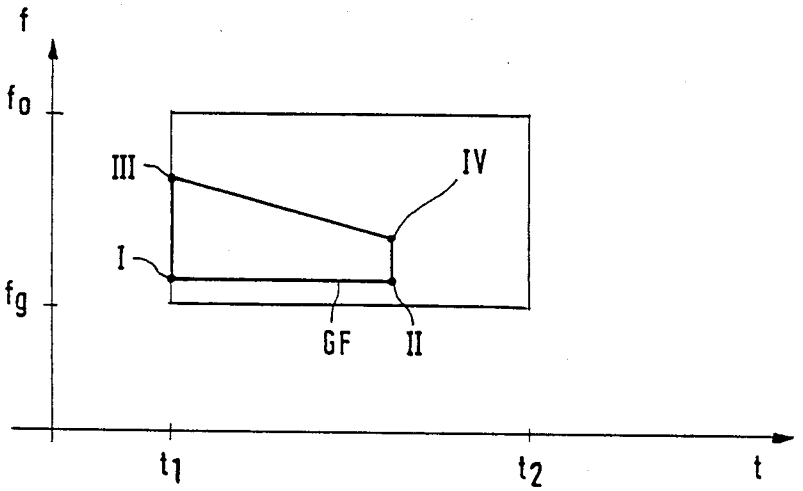
FIG. 2 is a diagrammatic representation of how a pattern is obtained that is used within the scope of the invention.

The obtaining of a pattern of this type within the scope of the invention is shown in diagram form in FIG. 2. For this purpose, the course of the output signal U is shown during a time frame determined by the times $t_1$ and $t_2$. It can be recognized clearly that U contains two components, of which one (GF) represents the fundamental frequency and the other one represents an oscillation behavior that is influenced by various influencing variables. These variables include the road condition, the tire inflation pressure, the steering angle or various acceleration factors, such as axle angles or wheel angles. They all result in a typical picture for the frequency spectrum that, in the pattern generator 5, is converted into a two-dimensional pattern.

In its dimensions, this pattern is determined by the output signals of circuits 1 to 4 and exhibits, for example, the drawn-in rectangular behavior. The corner coordinates I–IV are determined by the fundamental frequency $f_g$ at the time $t_1$ (Point I), the fundamental frequency at the time $t_2$ (Point II), the average excitation frequency at the point in time $t_1$ (Point III) and the excitation frequency at the point in time $t_2$ (Point IV). The abscissa value of Point III is selected to be identical to that of point I. The abscissa values of Points II and IV, on the basis of Point 1, are determined with an arbitrarily chosen abscissa value so that the area of the rectangle formed by the Points I to IV corresponds to the value of the energy content f/u that is emitted as the output value of circuit 4.

Figure 3:
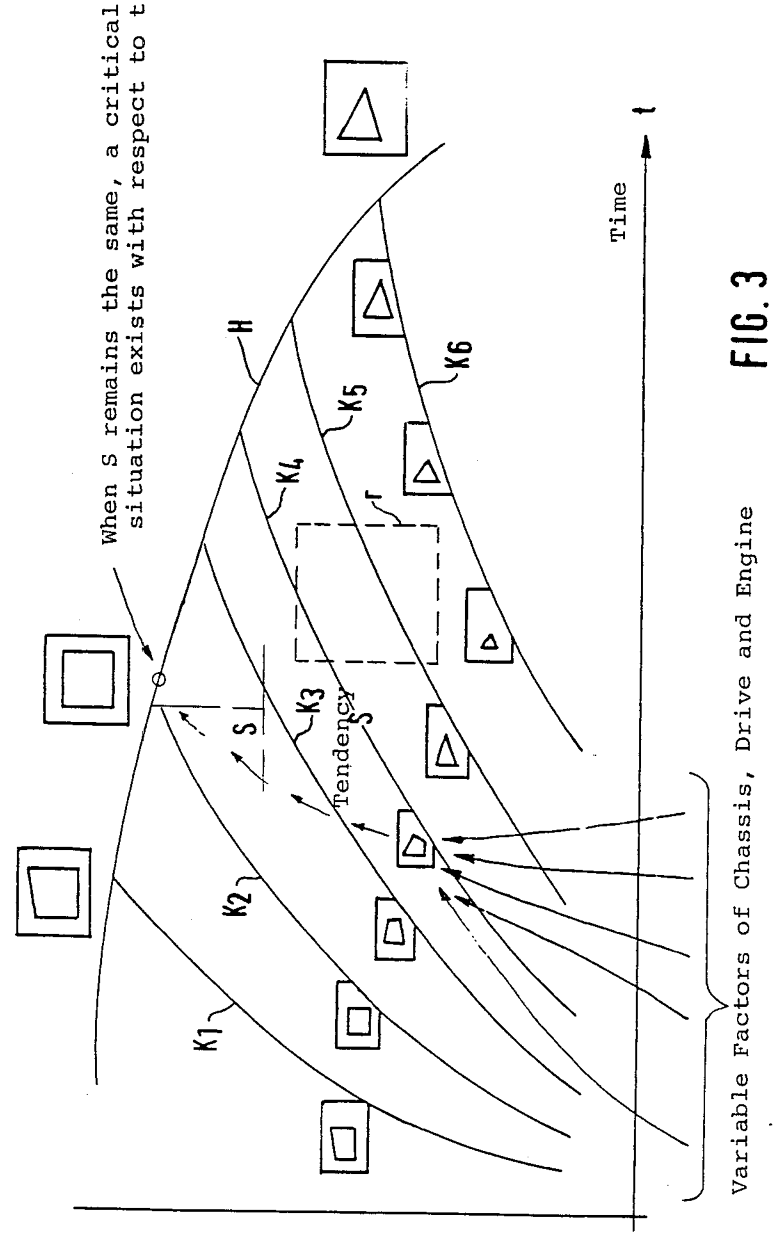
FIG. 3 is a diagram showing a preferred embodiment of a operation of the present invention.

This pattern that, as an example, is represented by Points I to IV, is characteristic for the driving or operating condition of the motor vehicle. When it changes, and Points I to IV are formed in a corresponding way for the respective new driving condition, the pattern also changes in a characteristic way. This is shown in FIG. 3.

In this figure, it is shown by characteristic curves for typical pattern shapes how these, in the case of a typical change of the driving condition, maintain their characteristic shape but show at the same time that a critical driving condition is approaching. The changes of typical pattern shapes that are shown, for example, on six curves K1–K6 all have the result that they, while the other parameters are maintained unchanged and one relevant parameter is changed, in the critical case, assume a shape that differs from the shape of this pattern in an uncritical condition. For a corresponding changed value of the variable parameter, the pattern slope changes only with respect to the size of the pattern.

One pattern respectively is assigned to the possible driving conditions of a motor vehicle and is located on one of the drawn-in six, or in the ideal case, infinite number of curves. As mentioned above, each curve K1-K6 is influenced by a relevant parameter, in which case the other parameters are unchanged. For the six curves shown in the example of FIG. 3, the variable parameters are, for example, the centripetal force, the static coefficient of friction, the acceleration, the camber angle, the steer angle and chassis constants. The end points of the curves are connected with one another by an envelope H that describes all occurring critical driving conditions. During its operation, a motor vehicle passed through a number of driving conditions that are exhibited in the shape of a two-dimensional pattern formed by the pattern generator 5. These patterns are contained in the patterns that are shown in diagram form in FIG. 3. The conformity of the current pattern with a pattern shown in FIG. 3 can be determined by conventional image-comparing techniques, as explained in detail below.

When the motor vehicle approaches a critical operating condition, as shown in Figure, this is exhibited by the fact that the pattern is located in proximity of the envelope H or aims in its direction. By the shape of the formation of the pattern and the comparison with preset patterns, it therefore becomes possible to recognize in time the approach of a critical operating condition and initiate corresponding countermeasures. These critical operating conditions are expressed in patterns that are shown for the first and the last curve and that differ from the patterns of the pertaining curve only with respect to the area. The basic shape and the association with one of the drawn-in curves K1-K6 for the different variable parameters is expressed in the similarity of the patterns.

The countermeasures to be initiated may now, in a conventional way, consist of an intervention into the engine or brake control or may in other contemplated ways be used for preventing the critical driving condition. These include an indication to the user of the vehicle as to when the operating condition of the motor vehicle approaches a critical condition.

The presetting of the preset two-dimensional patterns that are to be used for the comparison with the current pattern that corresponds to the respective operation condition, may take place in different ways. It is contemplated to store the patterns shown in FIG. 3 in a pattern memory 6 in FIG. 1. In contrast to this presetting of the comparative patterns that applies to all motor vehicles of one type, it is also contemplated to obtain these patterns for a specific motor vehicle. For this purpose, a teach-in circuit is used that is known per se, for example, from the field of manufacturing engineering and by which it is possible to store these patterns under preset operating conditions. A diagrammatically shown (FIG. 1) key 7 is used for this purpose that actuates the pattern memory 6 and enables it to retain the patterns furnished by the pattern generator 5 together with additional information. This information includes, for example, type and size of the variable parameter that assigns the pattern to one of the drawn-in six curves in FIG. 3 or describes its change in the course of this curve.

The pattern that is furnished by the pattern generator 5, as an embodiment of the invention, is compared with all patterns that are contained in the pattern memory 6. The conformity of the pattern originating from the pattern generator 5 with one of the stored patterns, as mentioned above, is determined by means of conventional image-comparing techniques. This comparison takes place in a pattern comparator 10.

Instead of comparing the current pattern with all stored patterns, as a means for the speeding-up of the pattern comparison, additional operating parameters of the motor vehicle may also be used, such as the speed v, the path covered s, the time t counted from the point in time of the start, the number of revolutions of the internal-combustion engine or the static coefficient of friction ( r), that may be determined by special sensors. These operating parameters are processed in a digital to analog converter 8 and are furnished to the pattern comparator 10. This pattern comparator 10, because of the current operating parameters, recognizes in which area the current pattern may be located; i.e., in which area of FIG. 3 the pertaining comparative pattern can be found. This comparative pattern, for an assumed operating case in FIG. 3, is drawn in by a rectangle r drawn by an interrupted line. In the assumed case of only six curves on which the pertaining patterns extend, the preset pattern in the respective operating case shown in FIG. 3, can be found only in the area of two curves. The pattern comparator 10 for the comparison of the current pattern, therefore, uses only the preset patterns that exist in this area. As a result, the processing time will be significantly shortened.

As soon as the current pattern is in conformity with a preset pattern so that the current operating condition of the motor vehicle is identified with a preset operation condition, the pattern comparator 10 also determines whether this operating condition is an imminent critical operating condition. This is made possible by the fact that two current patterns that follow one another at a defined time and are furnished by the pattern generator 5, for example, are compared and the degree of approximation to the envelope H is determined. When the operating condition of the motor vehicle approaches the critical operating condition, the pattern also approaches the envelope H. In this case, the pattern comparator 10 initiates warning and remedial measures. In certain preferred embodiments, the warning measures consist of warning texts that are generated in a speech generator 11 and are emitted in the conventional manner. The remedial measures n take place via a device 9 that carries out an intervention into the brake system or into the engine or drive operation, for example.

Instead of the two-dimensional pattern shown in FIGS. 2 and 3, this pattern may also be multidimensional in certain contemplated embodiments. For this purpose, corresponding computing processes are used that make possible the taking into account of additional dimensions of the pattern. These dimensions may account for additional operating parameters of the motor vehicle. These are, for example, mass, centripetal force, static coefficient of friction, acceleration, camber angle, steer angle, and chassis constants. In principle, however, this multidimensional pattern processing exceeds the process that is shown for a two-dimensional pattern in FIGS. 1–3.

By means of the invention, it is possible to analyze the current operating condition of a motor vehicle by means of an n-dimensional (in the shown embodiment, two-dimensional) pattern and to recognize in time the approach of a critical operating condition. The process of the pattern generation and of the pattern comparison represents a very efficient process because it makes it possible to assign to the current operating condition a pattern that in a simple and elegant manner, is generated solely from the output signal of a single relevant sensor and is processed in a simple way.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. A process for determining operating conditions of a motor vehicle from information contained in a frequency spectrum of variable, alternating output signals of a sensor for a relevant variable of the vehicle indicative of operating conditions of the vehicle, said output signals being supplied directly to a pattern generator for generating a specific pattern representative of the operating condition of the vehicle from the information contained in the frequency spectrum of said output signal and parallel to this direct supply, the output signal being supplied to said pattern generator via an analyzer for analyzing a first relevant parameter of the information indicative of the operating conditions of the vehicle contained in the frequency spectrum of said output signals to provide an analyzed signal, said process comprising the steps of:

analyzing via at least one additional analyzer an additional parameter of the information indicative of the operating conditions of the vehicle contained in the frequency spectrum of said output signals;

supplying said additionally analyzed signal to said pattern generator in parallel to said directly supplied output signal and said analyzed signal;

generating, in said pattern generator, an at least two-dimensional pattern characteristic of the operating conditions of the vehicle, a shape of said at least two-dimensional pattern being determined by a correlation of the information contained in the frequency spectrum of said output signals of said sensor and said analyzers;

comparing said at least two-dimensional pattern with preset patterns representative of specific operating conditions of the vehicle, said preset patterns including patterns representative of the approach of a critical operating condition of the vehicle; and providing an indicating measure when preset patterns representative of a critical operating condition of the vehicle are approached by said at least two-dimensional pattern.

2. A process according to claim 1, characterized in that the preset patterns, in a preceding learning step, are generated under defined operating conditions and are stored in a pattern memory.

3. A device according to claim 2, characterized in that at the same time with the patterns that are typical of the approach to a critical operating condition, an acoustic warning signal is stored that is actuated when the critical operating condition is approached.

4. A process according to claim 3, wherein said motor vehicle includes at least one additional sensor for an additional operating variable of the vehicle indicative of the operating condition of the vehicle, and further comprising the step of furnishing an output signal of said additional sensor to control access to said preset patterns via said additional sensor output signal.

* * * * *